US012394953B2

(12) United States Patent
Xie et al.

(10) Patent No.: US 12,394,953 B2
(45) Date of Patent: Aug. 19, 2025

(54) ADAPTER DEVICE FOR MOBILE TERMINAL WITH STABLE SUPPORT FEATURES

(71) Applicant: Luxshare Precision Industry(Chuzhou), Ltd., Chuzhou (CN)

(72) Inventors: Yujie Xie, Chuzhou (CN); Shun Wang, Chuzhou (CN); Changming Du, Chuzhou (CN); Huaizhou Liu, Chuzhou (CN)

(73) Assignee: LUXSHARE PRECISION INDUSTRY(CHUZHOU), LTD., Chuzhou (CN)

( * ) Notice: Subject to any disclaimer, the term of this patent is extended or adjusted under 35 U.S.C. 154(b) by 318 days.

(21) Appl. No.: 18/209,146

(22) Filed: Jun. 13, 2023

(65) Prior Publication Data

US 2024/0222922 A1 Jul. 4, 2024

(30) Foreign Application Priority Data

Dec. 28, 2022 (CN) ........................ 202223553742.6

(51) Int. Cl.

| | |
|---|---|
| ***H01R 13/00*** | (2006.01) |
| ***H01R 13/66*** | (2006.01) |
| ***H01R 31/06*** | (2006.01) |
| ***H01R 33/945*** | (2006.01) |

(52) U.S. Cl.

CPC ......... *H01R 33/945* (2013.01); *H01R 13/665* (2013.01); *H01R 31/065* (2013.01)

(58) Field of Classification Search

CPC combination set(s) only.
See application file for complete search history.

(56) References Cited

U.S. PATENT DOCUMENTS

| | | | | |
|---|---|---|---|---|
| 5,697,278 A * | 12/1997 | Shun-Yi | B26F 1/36 | 83/613 |
| 5,967,786 A * | 10/1999 | Wang | B26D 5/10 | 434/81 |
| RE38,219 E * | 8/2003 | Lee | B26F 1/36 | 83/167 |
| 6,739,244 B1 * | 5/2004 | Carbaugh | B26F 1/36 | 83/684 |

(Continued)

FOREIGN PATENT DOCUMENTS

| | | |
|---|---|---|
| CN | 209658949 U | 11/2019 |
| CN | 210120298 U | 2/2020 |

*Primary Examiner* — Phuong Chi Thi Nguyen

(74) *Attorney, Agent, or Firm* — Birch, Stewart, Kolasch & Birch, LLP

(57) ABSTRACT

An adapter device for a mobile terminal includes: an adapter plug configured to connect to the mobile terminal; a supporting body including a housing portion and a support portion; and an adapter socket connected to the supporting body. The adapter plug is connected to the housing portion. One end of the support portion is connected to the housing portion, and another end of the support portion is configured to be supported on a support surface. When the mobile terminal is charging, an earphone plug can be inserted to play audio of the mobile terminal. Besides, the mobile terminal is provided with stable support through the supporting body, which is convenient for users to watch videos.

17 Claims, 7 Drawing Sheets

(56) References Cited

U.S. PATENT DOCUMENTS

| | | | | |
|---|---|---|---|---|
| 6,938,542 | B1 * | 9/2005 | Ho | B44B 5/0023 D18/15 |
| 8,127,651 | B2 * | 3/2012 | Henkemeyer | B26F 1/36 83/549 |

* cited by examiner

ADAPTER DEVICE FOR MOBILE TERMINAL WITH STABLE SUPPORT FEATURES

CROSS-REFERENCE TO RELATED APPLICATION

This patent application claims priority of a Chinese Patent Application No. 202223553742.6, filed on Dec. 28, 2022 and titled “ADAPTER DEVICE FOR MOBILE TERMINAL”, the entire content of which is incorporated herein by reference.

TECHNICAL FIELD

The present disclosure relates to a field of electronic equipment, in particular to an adapter device for a mobile terminal.

BACKGROUND

A conventional adapter includes a charging plug and an audio output socket. The charging plug is connected to a mobile phone for charging. The audio output socket is connected to a headphone plug for audio output. Wired headphones can be used to watch videos while the mobile phone is charging. However, the existing adapters cannot provide stable support for the mobile phone, resulting in poor user experience.

SUMMARY

An object of the present disclosure is to provide an adapter device for a mobile terminal, which can provide stable support for the mobile terminal and facilitate users to watch videos while charging.

In order to achieve the above object, the present disclosure adopts the following technical solution: an adapter device for a mobile terminal, including: an adapter plug configured to be connected to the mobile terminal; a supporting body including a housing portion and a support portion, the adapter plug being connected to the housing portion, one end of the support portion being connected to the housing portion, and another end of the support portion being configured to be supported on a support surface; and an adapter socket connected to the supporting body.

In order to achieve the above object, the present disclosure adopts the following technical solution: an adapter device for a mobile terminal, including: an adapter plug configured to be electrically connected to the mobile terminal; a supporting body including a housing portion and a support portion supporting the housing portion, the housing portion defining an inner cavity, a first opening and a second opening, the first opening and the second opening communicating with the inner cavity; a circuit board, at least part of the circuit board being located in the inner cavity; and an adapter socket located in the inner cavity, the adapter socket defining a plug hole coaxial with the second opening; wherein the adapter plug and the adapter socket are electrically connected to the circuit board; the adapter plug extends beyond the housing portion through the first opening; and wherein one end of the support portion is connected to the housing portion, and another end of the support portion is configured to be supported on a support surface.

In the case of charging the mobile terminal, the adapter device disclosed in the present disclosure can also connect an earphone plug to play audio of the mobile terminal. Through the cooperation of the support portion and the support surface, it is beneficial to provide stable support for the mobile terminal and facilitate users to watch videos.

DETAILED DESCRIPTION

Figure 1:
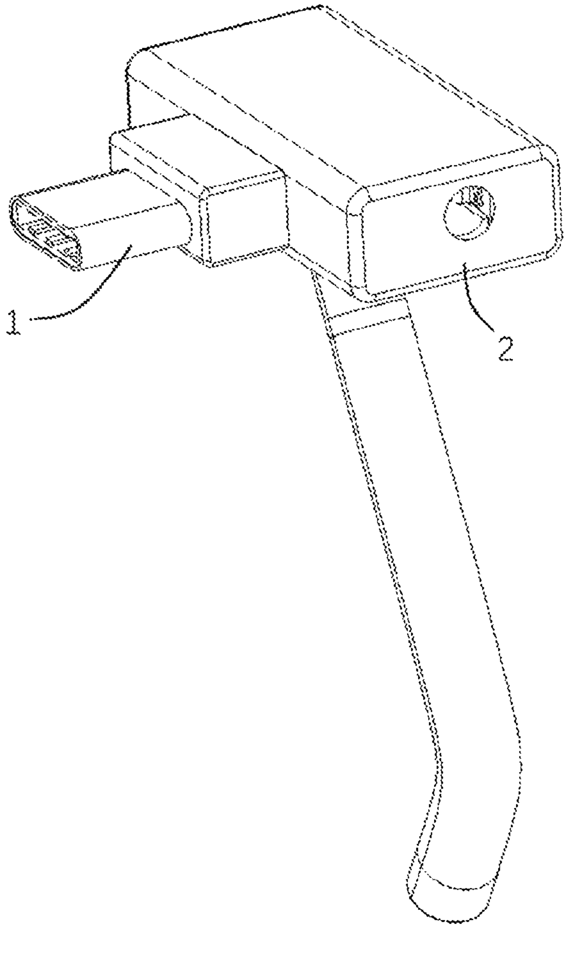
FIG. 1 is a perspective view of an adapter device for a mobile terminal in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms “a”, “said”, and “the” used in this application and the appended claims are also intended to include plural forms unless the context clearly indicates other meanings.

It should be understood that the terms “first”, “second” and similar words used in the specification and claims of this application do not represent any order, quantity or importance, but are only used to distinguish different components. Similarly, “an” or “a” and other similar words do not mean a quantity limit, but mean that there is at least one; “multiple” or “a plurality of” means two or more than two. Unless otherwise noted, “front”, “rear”, “lower” and/or “upper” and similar words are for ease of description only and are not limited to one location or one spatial orientation. Similar words such as “include” or “comprise” mean that elements or objects appear before “include” or “comprise” cover elements or objects listed after “include” or “comprise” and their equivalents, and do not exclude other elements or objects. The term “a plurality of” mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIG. 1 to FIG. 9, the present disclosure discloses an adapter device for a mobile terminal, including an adapter plug 1, a supporting body 2 and an adapter socket 3. The adapter plug 1 is configured to connect to the mobile terminal. The supporting body 2 is configured to support the mobile terminal 10. The adapter socket 3 is connected with the supporting body 2.

The supporting body 2 is an inflexible support member, which is beneficial to provide stable support for the mobile terminal 10. In the illustrated embodiment of the present disclosure, the supporting body 2 is made of hard plastic, such as TPE material of type 90A.

Figure 8:
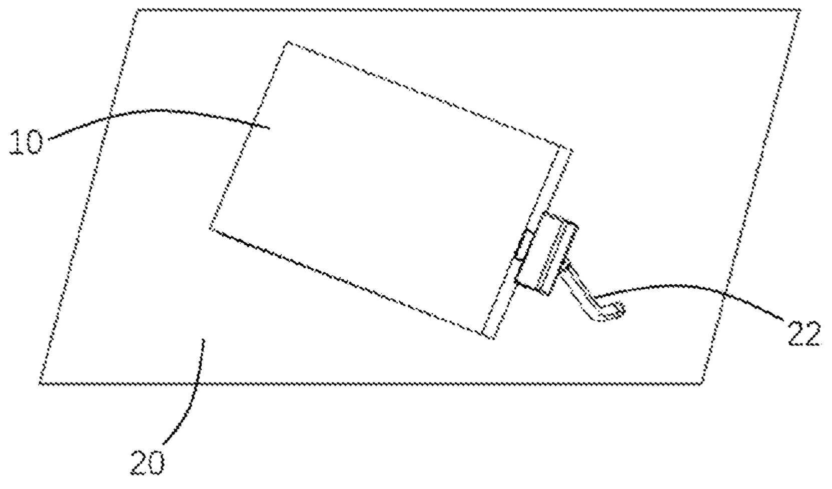
FIG. 8 is a schematic view of a state of use of the adapter device for the mobile terminal in accordance with an embodiment of the present disclosure.

The supporting body 2 is of a one piece configuration. The supporting body 2 can be injection-molded, which is convenient to manufacture and low in cost. Specifically, referring to FIG. 2, the supporting body 2 includes a housing portion 21 and a support portion 22. The housing portion 21 and the support portion 22 are integrally formed. The adapter plug 1 is connected to the housing portion 21. One end of the support portion 22 is connected to the housing portion 21, and another end of the support portion 22 is configured to be supported on a support surface 20. As shown in FIG. 8, the support surface 20 may be a desktop.

Figure 2:
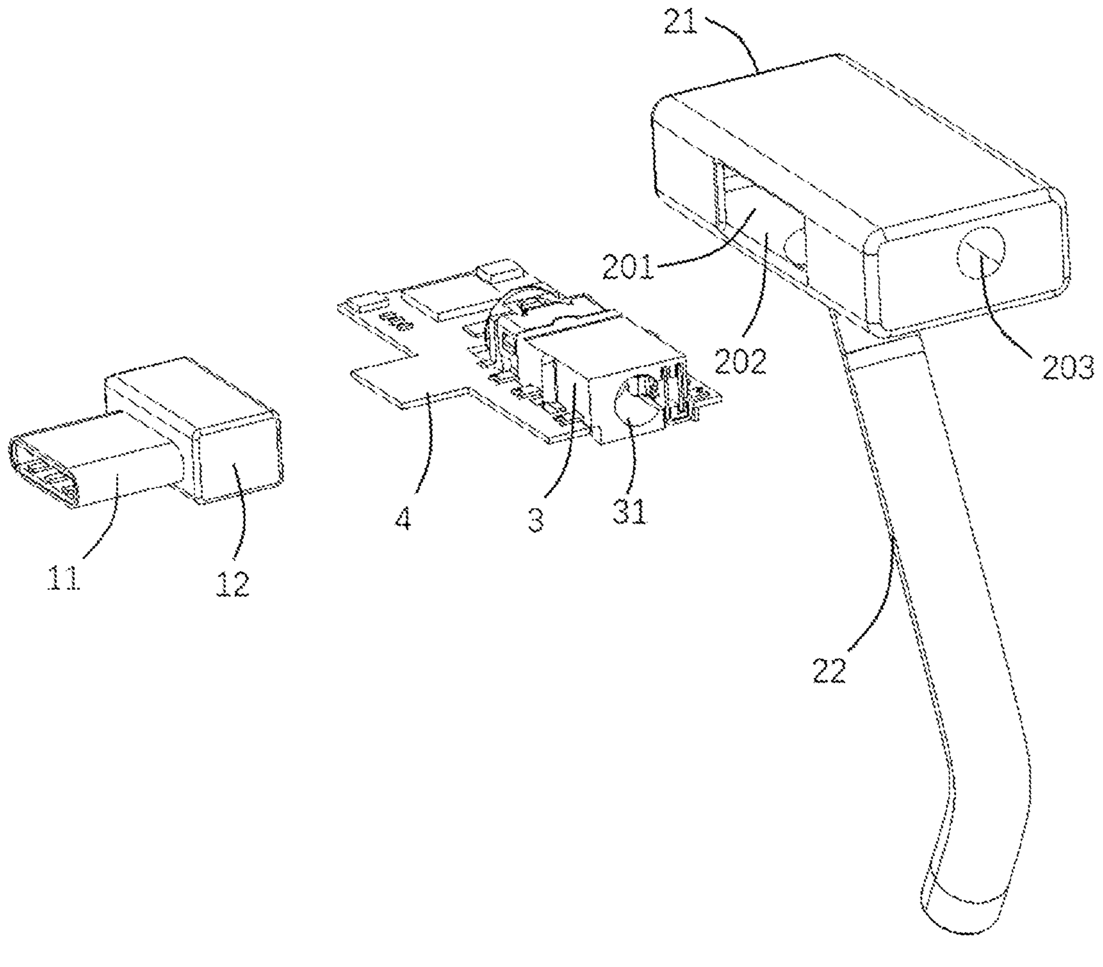
FIG. 2 is an exploded schematic view of FIG. 1.

Continuing to refer to FIG. 2, the housing portion 21 has an inner cavity 201, a first opening 202 and a second opening 203. Both the first opening 202 and the second opening 203 communicate with the inner cavity 201. The adapter plug 1 is plugged into the housing portion 21 through the first opening 202. At least part of the adapter plug 1 is accommodated in the inner cavity 201. The adapter socket 3 is accommodated in the inner cavity 201. The adapter socket 3 has a plug hole 31 facing the second opening 203. A shape of the second opening 203 matches a shape of the plug hole 31. Specifically, the plug hole 31 is coaxial with the second opening 203.

Figure 3:
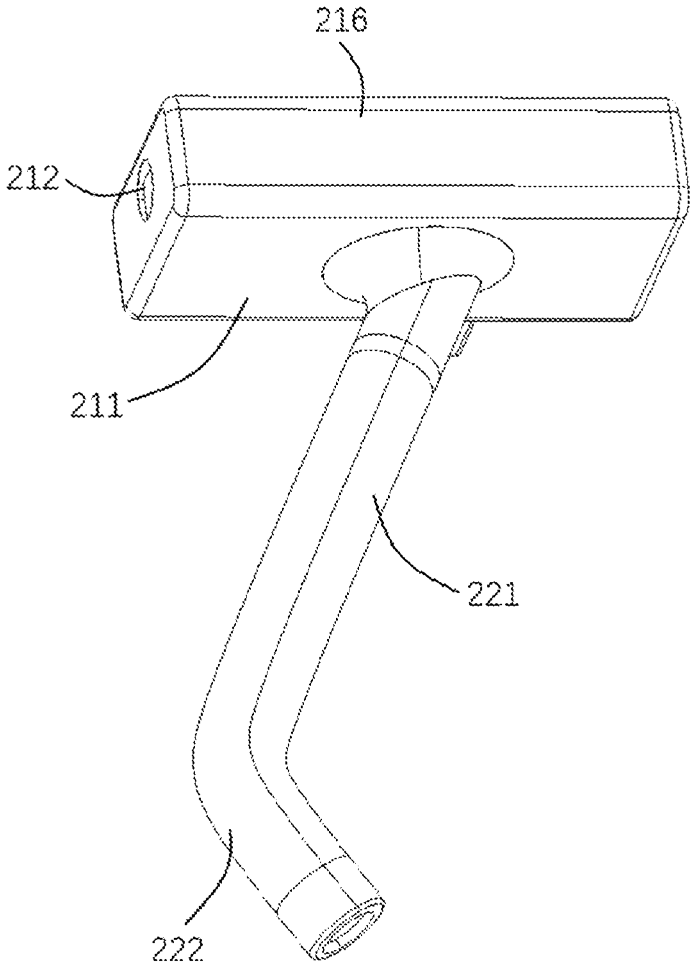
FIG. 3 is a perspective view of a supporting body in FIG. 2.
Figure 4:
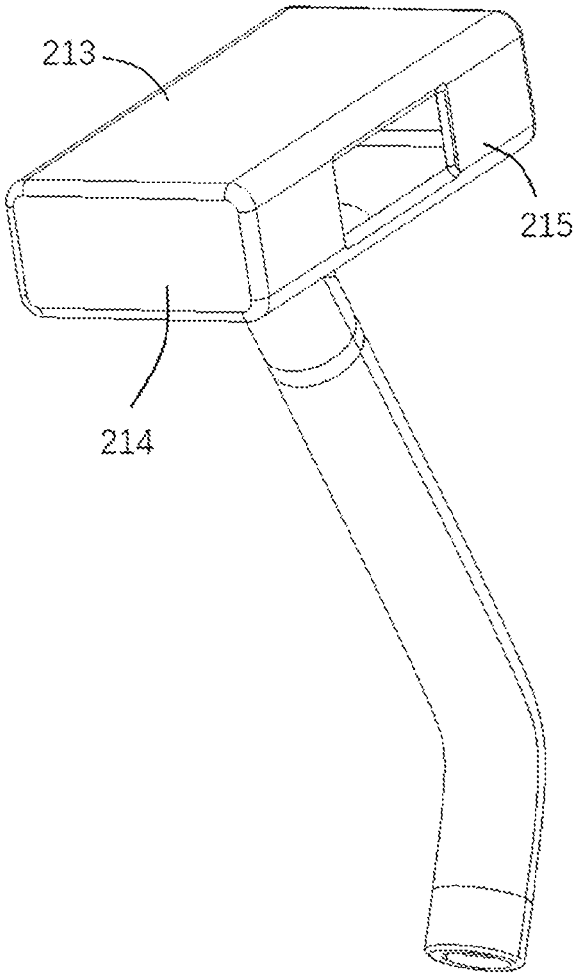
FIG. 4 is a schematic view of FIG. 3 from another angle.

In one embodiment of the present disclosure, the first opening 202 and the second opening 203 are provided on different surfaces of the housing portion 21, so as to facilitate an integrated arrangement of the adapter plug 1 and the adapter socket 3 in a narrow space. The orientations of the first opening 202 and the second opening 203 are different. An axis of the first opening 202 is perpendicular to an axis of the second opening 203. The housing portion 21 is a hollow cuboid structure. Referring to FIGS. 3 and 4, the housing portion 21 includes a first surface 211, a second surface 212, a third surface 213, a fourth surface 214, a fifth surface 215 and a sixth surface 216. The first surface 211 is parallel to the third surface 213; the second surface 212 is parallel to the fourth surface 214; and the fifth surface 215 is parallel to the sixth surface 216. The first opening 202 is rectangular and provided on the fifth surface 215. The second opening 203 is circular and is provided on the second surface 212.

In one embodiment of the present disclosure, referring to FIG. 3, the support portion 22 includes a first support section 221 and a second support section 222 connected to each other. The first support section 221 is connected to the first surface 211. Both the first support section 221 and the second support section 222 are hollow round rod structures. The first support section 221 is used to support the mobile terminal. The first support section 221 is inclined relative to the first surface 211. The second support section 222 is used for contacting with the desktop for support. The second support section 222 is inclined relative to the first support section 221.

Figure 9:
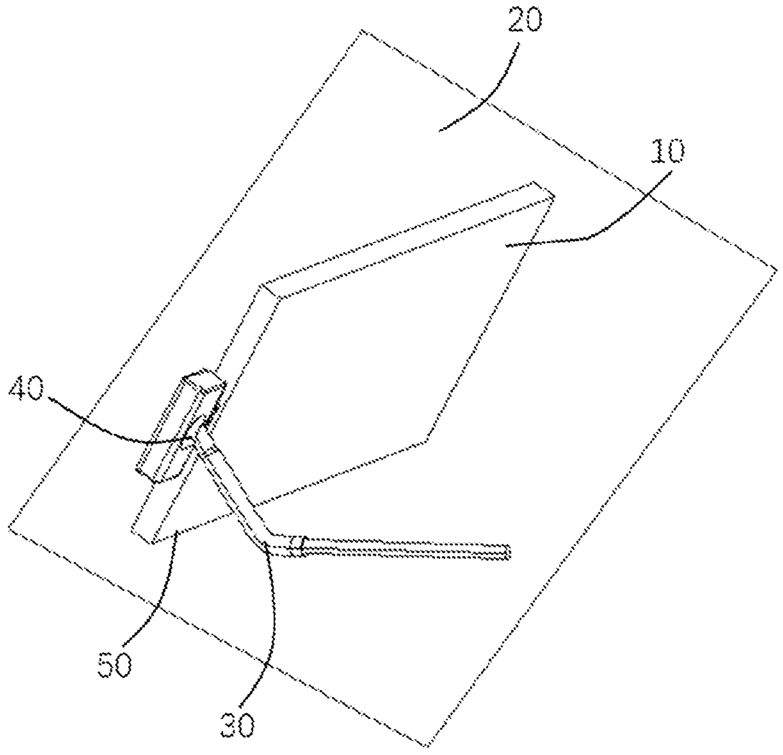
FIG. 9 is another schematic view of the state of use of the adapter device for the mobile terminal of FIG. 8 from another angle.

In some embodiments, the second surface 212 is perpendicular to the first surface 211. The first support section 221 is inclined from the first surface 211 to a direction close to the second surface 212. The second support section 222 is inclined from the first support section 221 to a direction away from the second surface 212. As shown in FIG. 9, the first support section 221 and the second support section 222 form a bent structure. A first support 30 is formed at a junction of the first support section 221 and the second support section 222. A second support 40 is formed at a junction of the first support section 221 and the housing portion 21. The adapter plug 1 is configured to form a third support 50 at an edge of the mobile terminal in contact with the support surface after being plugged into the mobile terminal. The first support 30 and the third support 50 contact the support surface 20, while the second support 40 is suspended relative to the support surface 60. Through three supports, a stable support can be formed.

Figure 6:
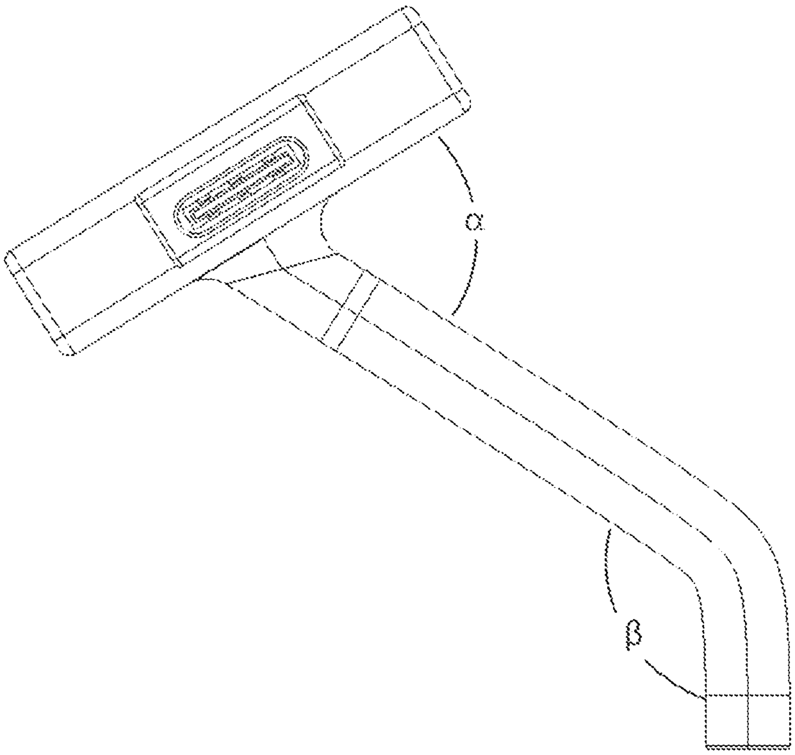
FIG. 6 is a right view of FIG. 1.
Figure 7:
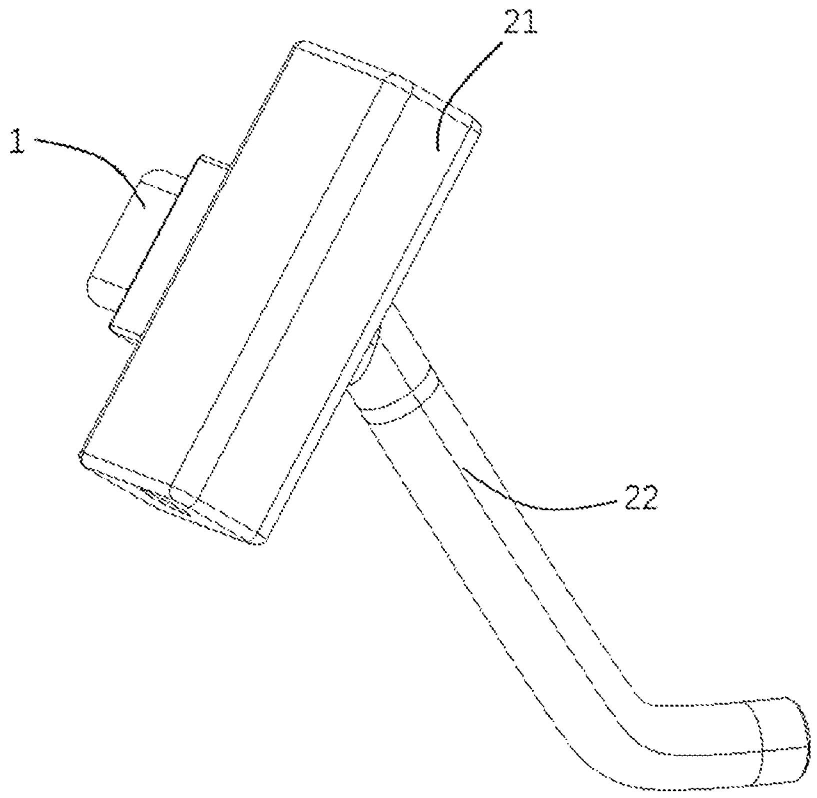
FIG. 7 is a schematic view of FIG. 1 from another angle.

Referring to FIG. 6, an angle between an axis of the first support section 221 and the first surface 211 is $\alpha$; an included angle between an axis of the second support section 222 and the axis of the first support section 221 is $\beta$; wherein a value of $\beta$ is greater than a value of $\alpha$. This is beneficial to provide a suitable viewing angle for the mobile terminal and improve user experience.

The adapter device further includes a circuit board 4. Both the adapter plug 1 and the adapter socket 3 are electrically connected to the circuit board 4, and the mobile terminal is charged through the adapter plug 1. The mobile terminal 10 can be a mobile phone, a tablet computer and the like. The supporting body 2 is configured to support the mobile terminal 10, so as to facilitate users to watch videos. The adapter socket 3 is connected to the supporting body 2. The adapter socket 3 can be connected to an earphone plug to play audio of the mobile terminal 10, and it is convenient to insert a wired earphone when the mobile terminal 10 is charging.

The support portion 22 has a channel communicating with the inner cavity 201. The channel is configured for a cable to pass through. One end of the cable is electrically connected to the circuit board 4 through the channel.

In some embodiments, the adapter plug 1 is a charging port or a data transmission port. The adapter socket 3 is an audio transmission port. The adapter plug 1 is mated with the mobile terminal, and is used for charging the mobile terminal or transmitting data. The adapter plug 1 cooperates with the circuit board 4 to convert the digital audio data of the mobile terminal into an analog audio signal and transmit the analog audio signal through the adapter socket 3. In one embodiment of the present disclosure, the adapter plug 1 adopts a Type-C charging plug, which can be connected to a mobile phone port. Referring to FIG. 2, the adapter plug 1 includes a plug body 11 and a base 12. At least part of the plug body 11 is installed in the base 12. At least part of the base 12 is plugged into the housing portion 21 through the first opening 202.

The adapter socket 3 can be one of a 2.5 mm earphone jack and a 3.5 mm earphone jack.

In the embodiment illustrated in the present disclosure, the adapter socket 3 adopts the 3.5 mm earphone jack, which can be adapted to a 3.5 mm earphone plug. The adapter socket 3 is assembled with the circuit board 4. At least part of the circuit board 4 is accommodated in the inner cavity 201. Specifically, referring to FIG. 5, the circuit board 4 includes a first circuit board 401 and a second circuit board 402. The first circuit board 401 and the second circuit board 402 are integrally arranged. The first circuit board 401 is accommodated in the inner cavity 201. The first circuit board 401 has a mounting hole 41. The mounting hole 41 is a U-shaped hole with an opening. The adapter socket 3 is assembled with the first circuit board 401 in the mounting hole 41 through the opening.

Figure 5:
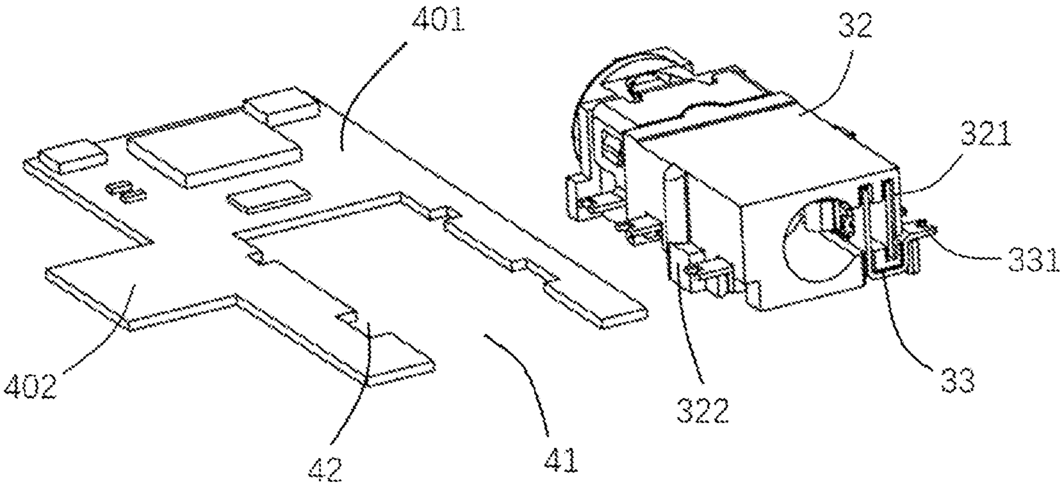
FIG. 5 is an exploded schematic view of some components in FIG. 2.

Continuing to refer to FIG. 5, the adapter socket 3 includes a body 32 and a plurality of conductive terminals 33. The body 32 has a plurality of mounting grooves 321 in which the conductive terminals 33 are disposed. Each conductive terminal 33 includes a contact portion 331 located outside the mounting groove 321. The contact portion 331 is in contact with the first circuit board 401 for electrical connection. The body 32 is fixed to the housing portion 21, which is beneficial to the stability of the adapter socket 3. When in use, the earphone plug is inserted into the plug hole 31 through the second opening 203 and in contact with the conductive terminals 33 to realize circuit conduction.

In an embodiment of the present disclosure, as shown in FIG. 5, the first circuit board 401 further has a plurality of positioning holes 42. Each positioning hole 42 is a U-shaped hole and communicates with the mounting hole 41. Both sides of the body 32 have protrusions 322 disposed in the positioning holes 42 to realize the assembly and positioning of the first circuit board 401 and the adapter socket 3, and improve the connection stability of the two.

The second circuit board 402 is electrically connected to the terminals in the plug body 11. Specifically, the second circuit board 402 extends out of the inner cavity 201 from the first opening 202 and is electrically connected to the terminals in the plug body 11. In the illustrated embodiment of the present disclosure, the second circuit board 402 is a sideward protrusion of the circuit board 4. The second circuit board 402 is inserted into the adapter plug 1 so that electrical connection of the adapter plug 1 and circuit board 4 is established.

In the case of charging the mobile terminal, the charging adapter device disclosed in the present disclosure can also be connected to the earphone plug to play the audio of the mobile terminal. The supporting body 2 is made of hard plastic, which is not easy to bend, and is beneficial to provide stable support for the mobile terminal.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An adapter device for a mobile terminal, comprising:

an adapter plug configured to be connected to the mobile terminal;

a supporting body comprising a housing portion and a support portion, the adapter plug being connected to the housing portion, one end of the support portion being connected to the housing portion, and another end of the support portion being configured to be supported on a support surface; and an adapter socket connected to the supporting body;

wherein the housing portion has an inner cavity, a first opening and a second opening;

both the first opening and the second opening communicate with the inner cavity; the adapter plug is mounted to the housing portion through the first opening; the adapter socket is accommodated in the inner cavity; and the adapter socket has a plug hole facing the second opening;

wherein a circuit board; at least part of the circuit board being located in the inner cavity; both the adapter plug and the adapter socket being electrically connected to the circuit board;

wherein the adapter plug is a charging port or a data transmission port; and the adapter socket is an audio transmission port.

2. The adapter device for the mobile terminal according to claim 1, wherein the support portion comprises a first support section and a second support section connected to each other; the first support section and the second support section form a bent structure; a first support is formed at a junction of the first support section and the second support section; a second support is formed at a junction of the first support section and the housing portion; the adapter plug is configured to form a third support at an edge of the mobile terminal in contact with a support surface after being plugged in the mobile terminal; and the first support and the third support contact the support surface while the second support is suspended relative to the support surface.

3. The adapter device for the mobile terminal according to claim 1, wherein the supporting body is of a one piece configuration.

4. The adapter device for the mobile terminal according to claim 3, wherein the support portion has a channel communicating with the inner cavity; one end of a cable is electrically connected to the circuit board through the channel.

5. The adapter device for the mobile terminal according to claim 3, wherein the first opening and the second opening are provided on different surfaces of the housing portion 21.

6. The adapter device for the mobile terminal according to claim 5, wherein an axis of the first opening is perpendicular to an axis of the second opening.

7. The adapter device for the mobile terminal according to claim 3, wherein the support portion comprises a first support section and a second support section connected to each other;

the housing portion comprises a first surface; and the first support section is connected to the first surface;

the second support section is arranged obliquely relative to the first surface; and the second support section is arranged obliquely relative to the first support section.

8. The adapter device for the mobile terminal according to claim 7, wherein the housing portion further comprises a second surface perpendicular to the first surface; the first support section is inclined from the first surface to a direction close to the second surface; and the second support section is inclined from the first support section in a direction away from the second surface.

9. The adapter device for the mobile terminal according to claim 8, wherein an included angle between an axis of the first support section and the first surface is $\alpha$; an included angle between an axis of the second support section and the axis of the first support section is $\beta$; wherein a value of $\beta$ is greater than a value of $\alpha$.

10. An adapter device for a mobile terminal, comprising:

an adapter plug configured to be electrically connected to the mobile terminal;

a supporting body comprising a housing portion and a support portion supporting the housing portion, the housing portion defining an inner cavity, a first opening and a second opening, the first opening and the second opening communicating with the inner cavity;

a circuit board, at least part of the circuit board being located in the inner cavity; and an adapter socket located in the inner cavity, the adapter socket defining a plug hole coaxial with the second opening;

wherein the adapter plug and the adapter socket are electrically connected to the circuit board; the adapter plug extends beyond the housing portion through the first opening; and wherein one end of the support portion is connected to the housing portion, and another end of the support portion is configured to be supported on a support surface;

wherein the housing portion has an inner cavity, a first opening and a second opening;

both the first opening and the second opening communicate with the inner cavity; the adapter plug is mounted to the housing portion through the first opening; the adapter socket is accommodated in the inner cavity; and the adapter socket has a plug hole facing the second opening;

wherein a circuit board; at least part of the circuit board being located in the inner cavity;

both the adapter plug and the adapter socket being electrically connected to the circuit board;

wherein the adapter plug is a charging port or a data transmission port; and the adapter socket is an audio transmission port.

11. The adapter device for the mobile terminal according to claim 10, wherein the support portion comprises a first support section and a second support section connected to each other; the first support section and the second support section form a bent structure; a first support is formed at a junction of the first support section and the second support section; a second support is formed at a junction of the first support section and the housing portion; the adapter plug is configured to form a third support at an edge of the mobile terminal in contact with a support surface after being plugged in the mobile terminal; and the first support and the third support contact the support surface while the second support is suspended relative to the support surface.

12. The adapter device for the mobile terminal according to claim 10, wherein the circuit board comprises a protrusion extending beyond the housing portion through the first opening, and the protrusion is inserted into the adapter plug so that electrical connection between the adapter plug and the circuit board is established.

13. The adapter device for the mobile terminal according to claim 10, wherein the first opening and the second opening are provided on different surfaces of the housing portion.

14. The adapter device for the mobile terminal according to claim 13, wherein an axis of the first opening is perpendicular to an axis of the second opening.

15. The adapter device for the mobile terminal according to claim 10, wherein the support portion comprises a first support section and a second support section connected to each other;

the housing portion comprises a first surface; and the first support section is connected to the first surface;

the second support section is arranged obliquely relative to the first surface; and the second support section is arranged obliquely relative to the first support section.

16. The adapter device for the mobile terminal according to claim 15, wherein the housing portion further comprises a second surface perpendicular to the first surface; the first support section is inclined from the first surface to a direction close to the second surface; and the second support section is inclined from the first support section in a direction away from the second surface.

17. The adapter device for the mobile terminal according to claim 16, wherein an included angle between an axis of the first support section and the first surface is $\alpha$; an included angle between an axis of the second support section and the axis of the first support section is $\beta$; wherein a value of $\beta$ is greater than a value of $\alpha$.

* * * * *